US006989875B2

(12) United States Patent
Yoon

(10) Patent No.: US 6,989,875 B2
(45) Date of Patent: Jan. 24, 2006

(54) LIQUID CRYSTAL DISPLAY DEVICE USING CHOLESTERIC LIQUID CRYSTAL AND A MANUFACTURING METHOD THEREOF

(75) Inventor: Sunghoe Yoon, Anyang-si (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/839,249

(22) Filed: May 6, 2004

(65) Prior Publication Data

US 2004/0207778 A1 Oct. 21, 2004

Related U.S. Application Data

(62) Division of application No. 10/175,491, filed on Jun. 20, 2002, now Pat. No. 6,774,962.

(30) Foreign Application Priority Data

Nov. 8, 2001 (KR) .............................. 2001-69443

(51) Int. Cl.
*G02F 1/1335* (2006.01)
*G02F 1/13* (2006.01)

(52) U.S. Cl. ........................ 349/96; 349/175; 349/185; 359/618; 359/619; 359/620

(58) Field of Classification Search .................. 349/95, 349/175, 185, 96; 359/618, 619, 620
See application file for complete search history.

(56) References Cited

U.S. PATENT DOCUMENTS

| | | | | |
|---|---|---|---|---|
| 5,715,023 | A | 2/1998 | Hoppe | |
| 6,339,501 | B1 * | 1/2002 | Kameyama et al. | 359/485 |
| 6,456,347 | B1 * | 9/2002 | Motomura et al. | 349/117 |
| 6,573,961 | B2 * | 6/2003 | Jiang et al. | 349/115 |
| 6,589,445 | B2 * | 7/2003 | Sugiyama et al. | 252/299.01 |
| 6,597,418 | B2 | 7/2003 | Moon et al. | |
| 6,667,794 | B2 * | 12/2003 | Arakawa et al. | 349/185 |
| 6,768,528 | B1 * | 7/2004 | Kwon et al. | 349/112 |
| 6,774,962 | B2 * | 8/2004 | Yoon | 349/98 |
| 6,822,710 | B1 * | 11/2004 | Son et al. | 349/115 |
| 2003/0112392 | A1 | 6/2003 | Moon et al. | |

FOREIGN PATENT DOCUMENTS

| | | | |
|---|---|---|---|
| JP | 08254689 A | * | 10/1996 |
| JP | 2003149635 | * | 5/2003 |
| JP | 2003149635 A | | 5/2003 |

* cited by examiner

*Primary Examiner*—Huyen Ngo
(74) *Attorney, Agent, or Firm*—McKenna Long & Aldridge LLP

(57) ABSTRACT

A liquid crystal display device includes a liquid crystal cell having a cholesteric liquid crystal color filter; an integrated collimating polarizer under the liquid crystal cell, the integrated collimating polarizer having a collimating layer and a circular polarizer on the collimating layer; a backlight under the integrated collimating polarizer; a diffusing layer over the liquid crystal cell; a retardation layer over the diffusing layer; and a linear polarizer over the retardation layer.

12 Claims, 6 Drawing Sheets

LIQUID CRYSTAL DISPLAY DEVICE USING CHOLESTERIC LIQUID CRYSTAL AND A MANUFACTURING METHOD THEREOF

This application is a divisional of prior application Ser. No. 10/175,491, filed Jun. 20, 2002 U.S. Pat. No. 6,774,962.

This application claims the benefit of Korean Patent Application No. 2001-69443, filed on Nov. 8, 2001, which is hereby incorporated by reference in its entirety for all purposes as if fully set forth herein.

BACKGROUND OF THE INVENTION

1. Field of the Invention

The present invention relates to a liquid crystal display (LCD) device, and more particularly to an LCD device using cholesteric liquid crystal and a manufacturing method thereof.

2. Discussion of the Related Art

Flat panel display (FPD) devices having small size, light-weight, and low power consumption have been a subject of recent research according to coming of the information age. Among many kinds of FPD devices, LCD devices are widely used for notebook personal computers (PCs) or desktop PCs because of their excellent characteristics of resolution, color display and display quality. Generally, in an LCD device, first and second substrates having respective electrodes are disposed to face each other with a liquid crystal layer is interposed therebetween. The liquid crystal layer has an optical anisotropy due to an electric field generated by applying a voltage to the respective electrodes. The LCD device displays images by using a transmittance difference according to the optical anisotropy of the liquid crystal layer.

FIG. 1 is a schematic cross-sectional view of a related LCD panel.

In FIG. 1, first and second substrates 10 and 20, referred to as lower and upper substrates, are facing and spaced apart from each other. A thin film transistor “T” (TFT) having a gate electrode 11, and source and drain electrodes 15*a* and 15*b* are formed on an inner surface of the first substrate 10. The TFT “T” further has an active layer 13 and an ohmic contact layer 14. A gate insulating layer 12 is formed on the gate electrode 11. A passivation layer 16 is formed on the TFT “T”. The passivation layer 16 covers the TFT “T” and has a contact hole 16*c* exposing the drain electrode 15*b* of the TFT. A pixel electrode 17 is formed on the passivation layer 16 and connected to the drain electrode 15*b* through the contact hole 16*c*.

A black matrix 21 is formed on an inner surface of the second substrate 20 at a position corresponding to the TFT “T”. A color filter layer 22*a* and 22*b*, in which colors of red (R), green (G) and blue (B) are alternately repeated, is formed on the black matrix 21. A common electrode 23 of transparent conductive material is formed on the color filter layer 22*a* and 22*b*. The color filter layer 22*a* and 22*b* of a single color corresponds to the one pixel electrode 17.

A liquid crystal layer 30 is interposed between the pixel and common electrodes 17 and 23. When a voltage is applied to the pixel and common electrodes 17 and 23, the arrangement of molecules of the liquid crystal layer 30 changes according to an electric field generated between the pixel and common electrodes 17 and 23. Orientation films (not shown) respectively formed on the pixel and common electrodes determine an initial arrangement of liquid crystal molecules.

First and second polarizers 41 and 42 are formed on outer surfaces of the first and second substrates 10 and 20, respectively. The first and second polarizers 41 and 42 convert natural light to linearly polarized light by transmitting only light whose polarizing direction is parallel to a transmission axis of the polarizer. The transmission axis of the first polarizer 41 is perpendicular to that of the second polarizer 42.

In FIG. 1, the TFT and the pixel electrode are formed on the lower substrate and the color filter layer and the common electrode are formed on the upper substrate. Recently, however, structures in which the TFT and the color filter layer are formed on the lower substrate, or the color filter layer and the common electrode are formed on the lower substrate and the TFT and the pixel electrode are formed on the upper substrate have been suggested.

Since an LCD device does not emit light for itself, an additional light source is necessary. Therefore, a backlight is disposed over the first polarizer 41 of FIG. 1 and light from the backlight is provided to a liquid crystal panel. Images are displayed by adjusting the light according to the arrangement of the liquid crystal layer. The LCD device of this structure is referred to as a transmissive LCD device. The pixel electrode 17 and the common electrode 23, two electrodes generating an electric field, are made of transparent conductive material and the first and second substrates 10 and 20 are also transparent.

Since only one polarizing component of the incident light is transmitted through the polarizer used in the LCD device and the other components are absorbed and then converted into heat loss, brightness of the LCD device is reduced by more than 50% considering reflection at a surface of the polarizer. To improve the brightness of the LCD device by reducing the heat loss, an LCD device having a reflective circular polarizer under the device is suggested. The circular polarizer transmits one circular polarizing component of the incident light and reflects the other components. The reflected circular polarizing components are reflected again by several optical parts under the circular polarizer and converted into a light component capable of passing the circular polarizer. Theoretically, since all the incident light is converted into one component and then transmits through the circular polarizer, loss of light occurring in a conventional linear polarizer is remarkably reduced.

FIG. 2 is a schematic cross-sectional view of a related art LCD device.

In FIG. 2, a first polarizer 42 that is a linear polarizer is disposed under a liquid crystal cell 41, in which a liquid crystal layer is interposed between two substrate having respective electrodes on inner surfaces. A retardation layer 43, which converts linear polarization into circular polarization and vice versa, and a second polarizer 45 that is a linear polarizer are disposed under the first polarizer 42. A compensation film 44 can be interposed between the retardation layer 43 and the second polarizer 45. A sheet 46 for collecting and diffusing light and a backlight 47 are sequentially disposed under the second polarizer 45. On the other hand, a third polarizer 48 whose transmission axis is perpendicular to that of the first polarizer 42 is disposed over the liquid crystal cell 41. The liquid crystal cell 41 can have the same structure as or different structure from the liquid crystal cell of FIG. 1.

The second polarizer 45 can be made through forming a cholesteric liquid crystal layer 45*b* on a transparent substrate 45*a*. The cholesteric liquid crystal has a selective reflection property that only light of a specific wavelength is selectively reflected according to a helical pitch of the molecules of the cholesteric liquid crystal. The polarization of the reflected light is determined according to a rotational direction of the liquid crystal. For example, if a liquid crystal layer has a left-handed structure where liquid crystal molecules rotate counter clockwise along a rotational axis, only left-handed circularly polarized light having a corresponding color, i.e., wavelength, is reflected. Since the pitch of the cholesteric liquid crystal that light experiences is varied according to an incident angle, a wavelength of reflected light is also varied. Accordingly, there is a color shift such that a color of transmitted light varies according to a viewing angle. To compensate for the color shift, a compensation film 44 may be disposed over the second polarizer 45.

As shown in FIG. 2, a sheet 46 for collecting light from the backlight 47 and diffusing light to the liquid crystal cell 41 can be disposed between the second polarizer 45 and the backlight 47.

In the LCD device of FIG. 2, brightness is improved through increasing transmitted light by using a circular polarizer to a conventional LCD device. However, a conventional linear polarizer is still necessary because polarizing efficiency of the circular polarizer is lower than that of the linear polarizer. Moreover, a retardation layer should be attached for light that passes the circular polarizer to transmit through the linear polarizer. Therefore, production cost is high due to a plurality of films required for an increase in brightness. However, the increase in brightness is not large and a viewing angle is narrow.

On the other hand, a LCD device using a cholesteric liquid crystal color filter (CLC) has been researched and developed recently. Since cholesteric liquid crystal has a selective reflection property, brightness can be improved in contrast with a LCD device using a color filter of absorption type.

FIG. 3 is a cross-sectional view of a related art LCD device using a CLC.

In FIG. 3, a circular polarizer 53 using cholesteric liquid crystal is disposed under a liquid crystal cell 51 having a CLC color filter 52. A collection sheet 54 and a backlight 55 are sequentially disposed under the circular polarizer 53.

A diffusing sheet 56 for diffusing light transmitted through the liquid crystal cell 51 is disposed over the liquid crystal cell 51. A retardation layer 57 and a linear polarizer 58 are sequentially disposed over the diffusing sheet 56.

The collection sheet 54 for collecting light entering the circular polarizer 53 and the CLC 52 is made by forming a film 54*b* having a high condensing pattern on a transparent substrate 54*a*. The collection sheet 54 may be made of only the film 54*b* without the substrate 54*a*. Moreover, the backlight 55 may include the high condensing pattern or means.

In a LCD device having the structure of FIG. 3, a wavelength variation of reflected light according to an incident angle to the cholesteric liquid crystal is solved by using a high condensing backlight and a collection sheet. Moreover, the light efficiency increases by using a circular polarizer and a reflective CLC, and the collected light is diffused through a diffusing layer over the liquid crystal cell. Therefore, the brightness is improved in contrast with a related art LCD device of FIG. 2, and the problem of a color shift according to a viewing angle is solved. However, the production cost and the thickness of the LCD device also increase due to the individual circular polarizer and collection sheet.

SUMMARY OF THE INVENTION

Accordingly, the present invention is directed to a liquid crystal display device that substantially obviates one or more of problems due to limitations and disadvantages of the related art.

An advantage of the present invention is to provide a liquid crystal display device of high brightness, wide viewing angle and low thickness with low cost and short manufacturing process by forming a circular polarizer and a collection sheet on one substrate.

Additional features and advantages of the invention will be set forth in the description that follows, and in part will be apparent from the description, or may be learned by practice of the invention. Other advantages of the invention will be realized and attained by the structure particularly pointed out in the written description and claims hereof as well as the appended drawings. To achieve these and other advantages and in accordance with the purpose of the present invention, as embodied and broadly described, a liquid crystal display device includes a liquid crystal cell; a collimating polarizer under the liquid crystal cell, the collimating polarizer having a collimating layer and a circular polarizer fixed on the collimating layer; a backlight under the collimating polarizer; a diffusing layer over the liquid crystal cell; a retardation layer over the diffusing layer; and a linear polarizer over the retardation layer.

In another aspect, a liquid crystal display device includes a liquid crystal cell; a collimating polarizer under the liquid crystal cell, the collimating polarizer having collimating layer, a circular polarizer and a transparent substrate between the collimating layer and the circular polarizer; a backlight under the collimating polarizer; a diffusing layer over the liquid crystal cell; a retardation layer over the diffusing layer; and a linear polarizer over the retardation layer. In another aspect, a fabricating method of a collimating polarizer for a liquid crystal display device includes providing a first transparent substrate; coating a cholesteric liquid crystal on the first transparent substrate; exposing and hardening the cholesteric liquid crystal to form a pitch of the cholesteric liquid crystal; coating a resin on the cholesteric liquid crystal; and patterning and hardening the resin to form a collimating layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included herewith to provide a further understanding of the invention and are incorporated in and constitute a part of this specification, illustrate embodiments of the invention and together with the description serve to explain the principle of the invention.

In the drawings.

DETAILED DESCRIPTION OF THE ILLUSTRATED EMBODIMENTS

Reference will now be made in detail to the illustrated embodiments of the present invention, examples of which are illustrated in the accompanying drawings. Wherever possible, similar reference numbers will be used throughout the drawings to refer to the same or like parts.

Figure 1:
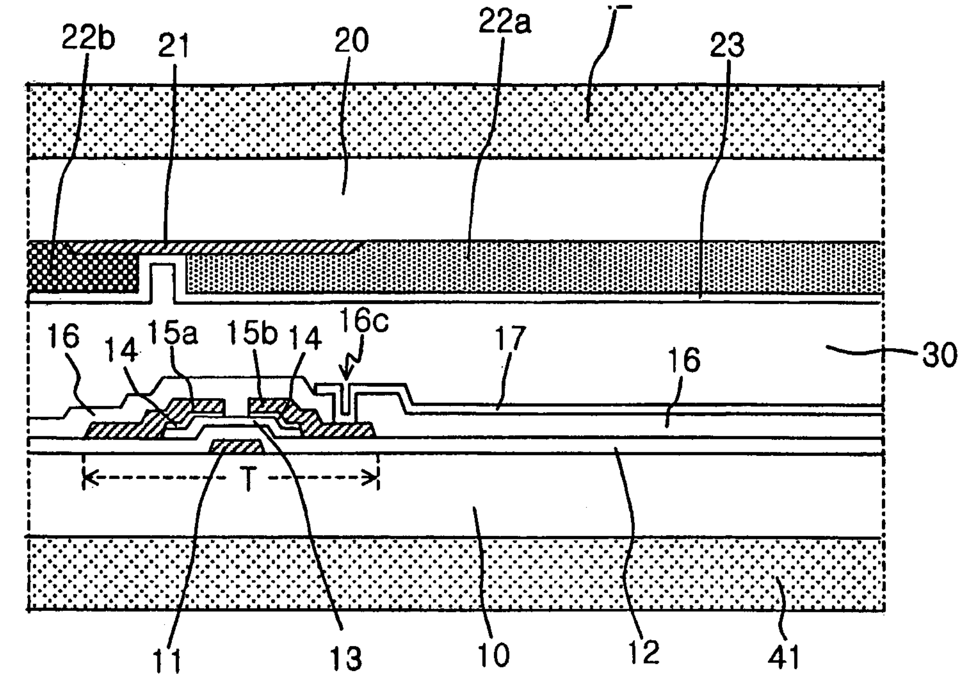
FIG. 1 is a schematic cross-sectional view of a related art LCD panel.
Figure 2:
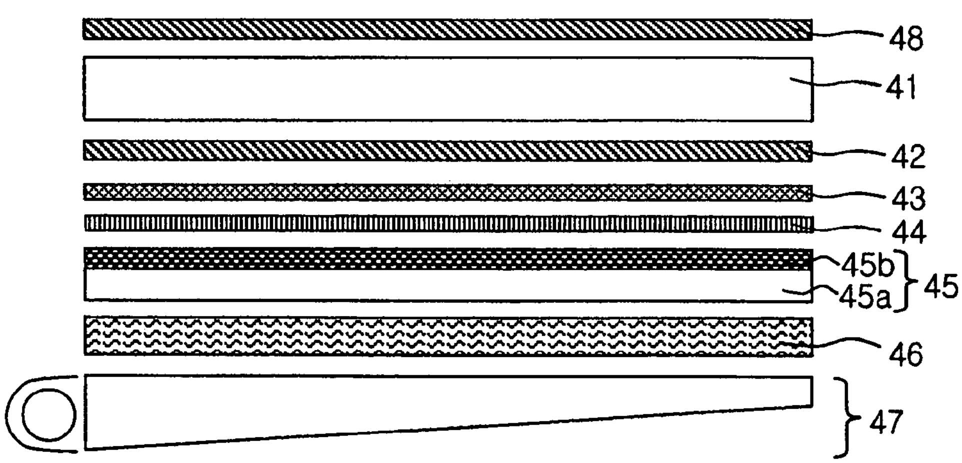
FIG. 2 is a schematic cross-sectional view of a related art LCD device.
Figure 3:
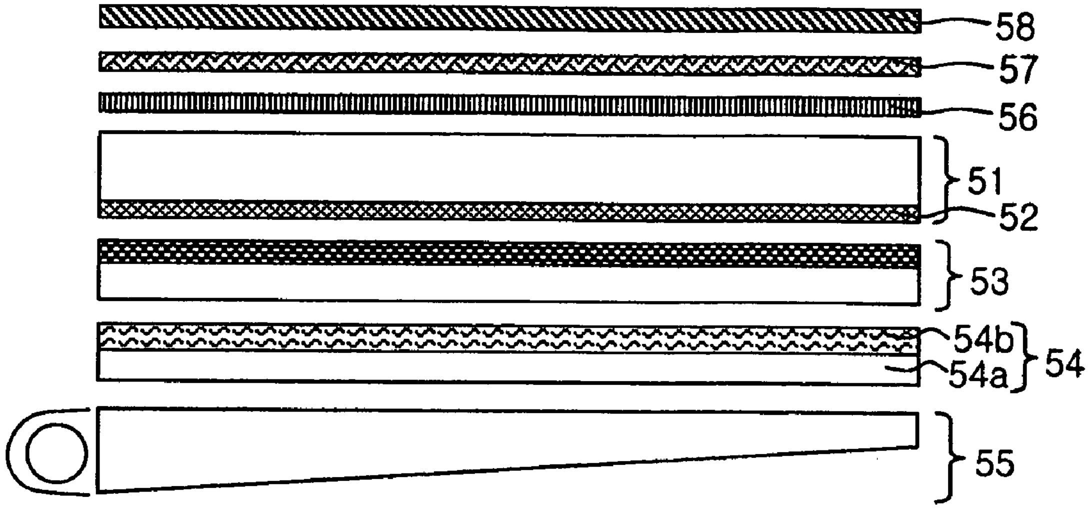
FIG. 3 is a cross-sectional view of a related art LCD device using a CLC.
Figure 4:
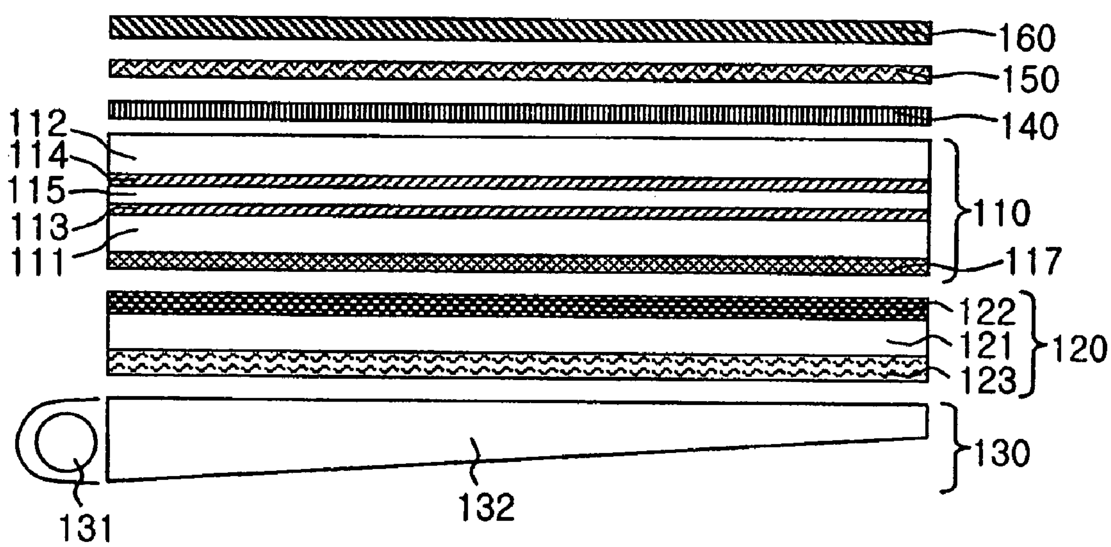
FIG. 4 is a schematic cross-sectional view of an LCD device according to a first embodiment of the present invention.

FIG. 4 is a schematic cross-sectional view of an LCD device according to a first embodiment of the present invention.

In FIG. 4, a collimating polarizer 120 is disposed under a liquid crystal cell 110 and a backlight 130 is disposed under the collimating polarizer 120. The liquid crystal cell 110 includes first and second substrates 111 and 112 facing each other and having respective electrodes 113 and 114 on inner sides, and a liquid crystal layer 115 between the first and second substrates 111 and 112. A cholesteric liquid crystal (CLC) 117 is formed on an outer side of the first substrate 111. A plurality of thin film transistors (TFTs) and pixel electrodes (not shown) may be formed on the inner side of the first substrate 111 and a common electrode (not shown) may be formed on the inner side of the second substrate 112. Otherwise, a common electrode may be formed on the inner side of the first substrate 111 and a plurality of TFTs and pixel electrodes may be formed on the inner side of the second substrate 112. The collimating polarizer 120 includes a circular polarizer 122 of a cholesteric liquid crystal on a transparent substrate 121, and a collimating layer 123 under the transparent substrate 121 having a condensing pattern. The backlight 130 may include a lamp 131 as a passing the first and second transparent substrates 124 and 121 having the cholesteric liquid crystal layer 122*a* therebetween through two rollers spaced apart from each other.

Figure 5A:
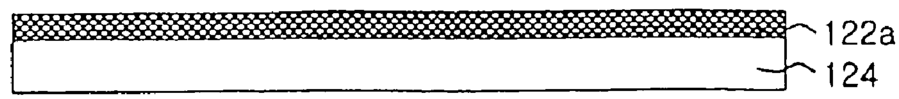
FIGS. 5A to 5G are schematic cross-sectional views showing a fabricating process of a collimating polarizer according to a first embodiment of the present invention.
Figure 5B:
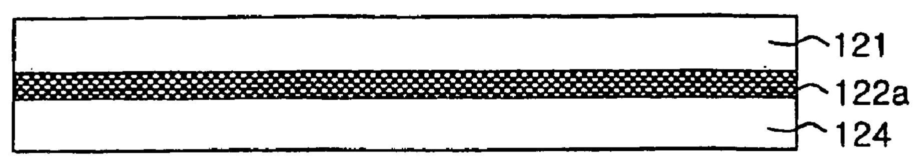
Figure 5C:
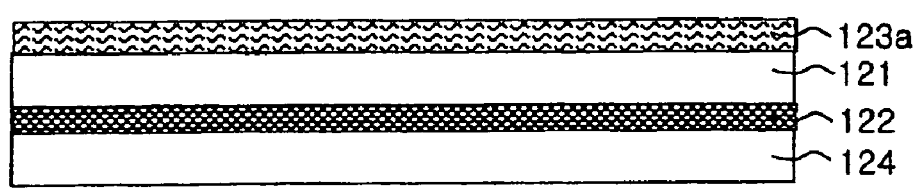

In FIG. 5C, after exposing the cholesteric liquid crystal layer 122*a* (of FIG. 5B) to light such as ultraviolet (UV) light to select a pitch and hardening the exposed cholesteric liquid crystal layer to form a circular polarizer 122, material such as light curable resin is coated on the second transparent substrate 121 to form a resin 123*a*. The organic film 123*a* is coated by a plane roll and then patterned by a stamp to provide a condensing pattern on the organic film 123*a*. Otherwise the organic film 123*a* may be coated and simultaneously patterned by an embossed roll. A condensing film or collimating layer is completed by hardening the patterned organic film 123*a* with UV or heat. The organic film 123*a* may be hardened after coating and patterning or at the same time with patterning to form a condensing film or collimating layer 123. The pattern of the condensing film or collimating layer 123 is one of prism shape, holography shape in which a incoherent light is added to transmitted light for reproduction and a micro lens shape having two side surfaces that circular, or circular and planar.

Figure 5D:
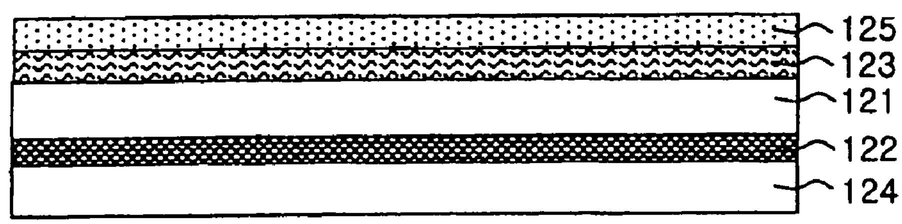

In FIG. 5D, a first protection film 125 is attached on the condensing film 123 for protection.

Figure 5E:
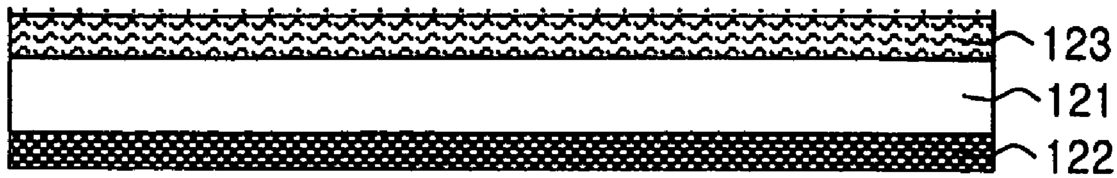
Figure 5F:
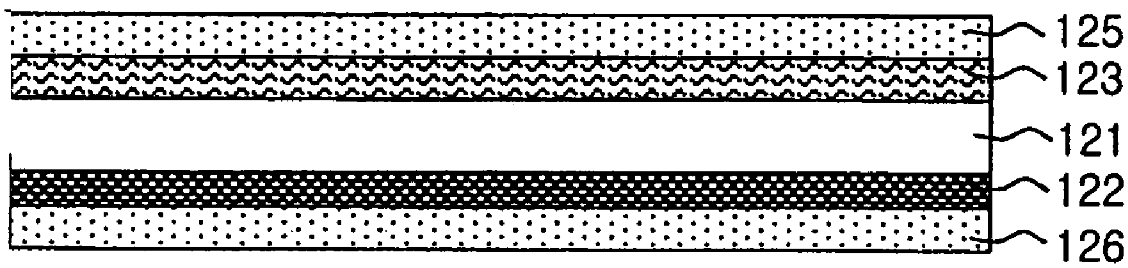

In FIGS. 5E and 5F, after the first transparent substrate 124 under the circular polarizer 122 is eliminated, a second protection film 126 is attached under the circular polarizer 122.

Figure 5G:
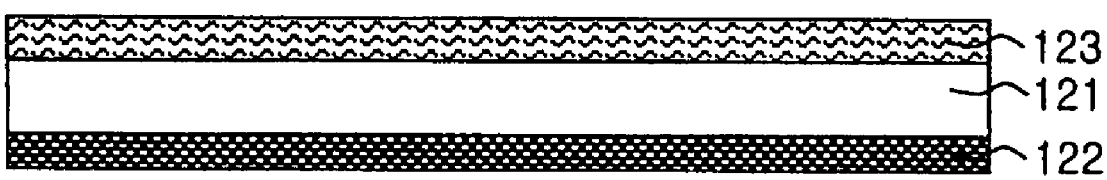
Figure 6:
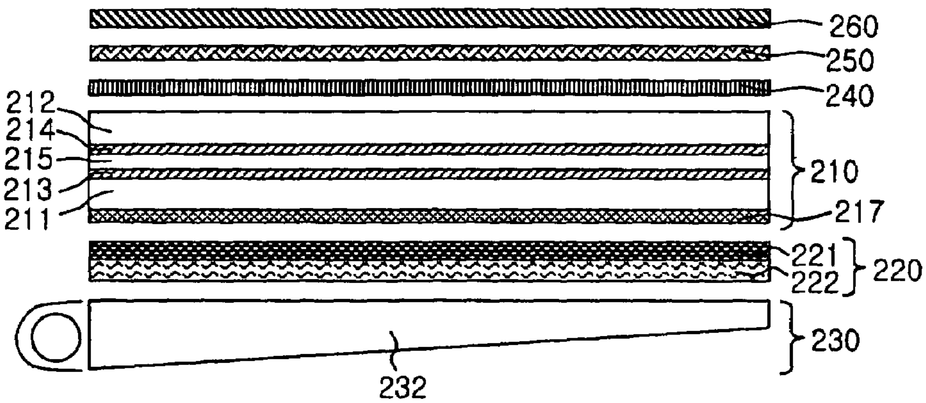
FIG. 6 is a schematic cross-sectional view of an LCD device according to a second embodiment of the present invention.

Therefore, an integrated condensing or collimating polarizer is provided in a state of FIG. 5F to protect the circular polarizer 122 and the collimating layer 123. When the integrated collimating polarizer is used for an LCD device, the first and second protection films 125 and 126 are eliminated as shown in FIG. 5G Moreover, the integrated collimating polarizer may be attached to the liquid crystal cell 110 (of FIG. 4) or to the backlight 130. diffusing layer 240. Moreover, a linear polarizer 260 is disposed over the retardation layer 250.

FIGS. 7A to 7F are schematic cross-sectional views showing a fabricating process of an integrated condensing or collimating polarizer according to a second embodiment of the present invention.

Figure 7A:
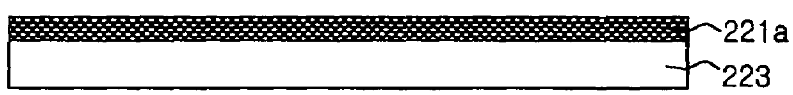
FIGS. 7A to 7F are schematic cross-sectional views showing a fabricating process of a collimating polarizer according to a second embodiment of the present invention.

In FIG. 7A, a cholesteric liquid crystal layer 221*a* is formed on a transparent substrate 223. The cholesteric liquid crystal layer 221*a* may be formed by a coating method, especially, a roll coating method using a roller so that a surface can be planarized and the cholesteric liquid crystal layer 221*a* can have a uniform thickness.

Figure 7B:
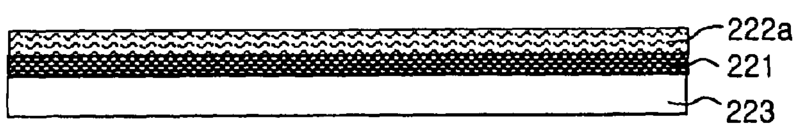

In FIG. 7B, after exposing the cholesteric liquid crystal layer 221*a* (of FIG. 7A) to ultraviolet (UV) light to select a pitch and hardening the exposed cholesteric liquid crystal layer to form a circular polarizer 221, material such as light curable resin is coated on the circular polarizer 221 to form a resin 222*a*. The organic film 222*a* is coated by a plane roll and then patterned by a stamp to provide a condensing pattern on the organic film 222*a*. Otherwise, the organic film 222*a* may be coated and simultaneously patterned by an embossed roll. A condensing film or collimating layer is completed by hardening the patterned organic film 222*a* with UV or heat. The organic film 222*a* may be hardened after coating and patterning or at the same time with patterning to form a condensing film or collimating layer 222. The pattern of the collimating layer 222 is one of prism shape, holography shape and a micro lens shape.

Figure 7C:
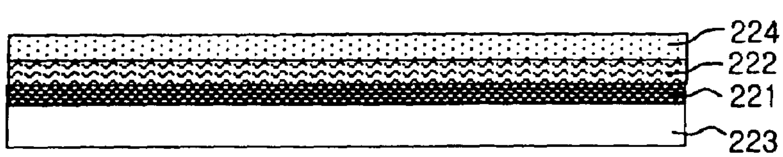

In FIG. 7C, a first protection film 224 is attached on the collimating layer 222 for protection.

Figure 7D:
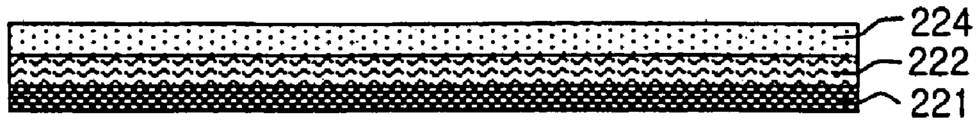
Figure 7E:
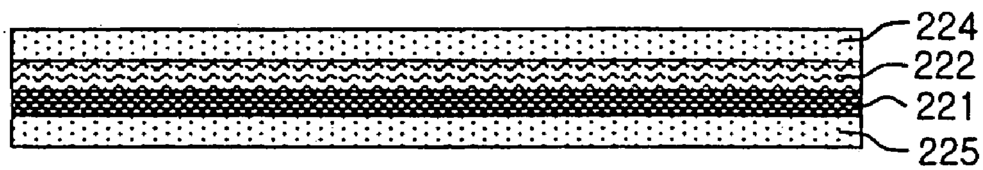
Figure 7F:

In FIGS. 7D and 7E, after the substrate 223 under the circular polarizer 221 is eliminated, a second protection film 225 is attached under the circular polarizer 221.

Since the substrate between the circular polarizer and the collimating layer of the first embodiment is eliminated from the integrated collimating polarizer according to the second embodiment of the present invention, the thickness is reduced so that brightness can be further improved due to reduction of light loss.

In the first and second embodiments, a resin is hardened with UV light and then separated from a stamp to form a condensing film or collimating layer after being coated and patterned with the stamp. In the other embodiment, the organic film may be hardened with UV after the stamp is separated.

The step of forming a circular polarizer may include steps of annealing or aging for alignment of the cholesteric liquid crystal. Moreover, after completing an integrated collimating polarizer, an additional annealing for complete hardening may be included.

For attaching an integrated collimating polarizer to a liquid crystal cell, a glue is coated on a surface of the integrated collimating polarizer before the second protection film is formed or a film treated with a glue is used as the second protection film for the glue to be transcribed to the integrated collimating polarizer.

Consequently, the color shift problem according to the viewing angle of the cholesteric liquid crystal is solved due to the condensing backlight and the condensing film or collimating layer and transmittance increases by using the circular polarizer and the CLC. Accordingly, brightness and viewing angle of an LCD device is improved. The fabricating process is simplified and the production cost is reduced through forming a condensing film or collimating layer and a circular polarizer on one substrate. The thickness of the LCD device is also reduced. The thickness of the LCD device may be further reduced and brightness may be further improved by eliminating a substrate between the circular polarizer and the condensing film or collimating layer.

What is claimed is:

1. A liquid crystal display device, comprising:

a liquid crystal cell;

a collimating polarizer under the liquid crystal cell, the collimating polarizer having a collimating layer, a circular polarizer and a transparent substrate between the collimating layer and the circular polarizer;

a backlight under the collimating polarizer;

a diffusing layer over the liquid crystal cell;

a retardation layer over the diffusing layer; and a linear polarizer over the retardation layer.

2. A method of fabricating an integrated collimating polarizer for a liquid crystal display device, comprising:

providing a first transparent substrate;

coating a cholesteric liquid crystal on the first transparent substrate;

exposing and hardening the cholesteric liquid crystal to form a pitch of the cholesteric liquid crystal;

coating a resin on the cholesteric liquid crystal; and patterning and hardening the resin to form a collimating layer.

3. The method according to claim 2, further comprising disposing a second transparent substrate on the cholesteric liquid crystal.

4. The method according to claim 2, further comprising forming first and second protection films on the collimating layer and under the cholesteric liquid crystal, respectively.

5. The method according to claim 2, wherein a stamp is used in patterning the resin.

6. The method according to claim 2, wherein embossing is used in patterning the resin.

7. The method according to claim 2, wherein the exposing and hardening are provided using ultraviolet light.

8. The method according to claim 2, wherein the exposing and hardening are provided using heat.

9. A method of fabricating an integrated collimating polarizer for a liquid crystal display device, comprising:

providing a first transparent substrate;

coating a cholesteric liquid crystal on the first transparent substrate;

providing a second transparent substrate on the cholesteric liquid crystal layer;

exposing and hardening the cholesteric liquid crystal to form a pitch of the cholesteric liquid crystal;

coating a resin on the cholesteric liquid crystal; and patterning and hardening the resin to form a collimating layer.

10. The method according to claim 9, wherein the exposing and hardening are provided using ultraviolet light.

11. The method according to claim 9, wherein the exposing and hardening are provided using heat.

12. The method according to claim 9, further comprising passing the first and second substrates with the cholesteric liquid crystal therebetween through rollers before exposing and hardening the cholesteric liquid crystal.

* * * * *